US008682356B2

(12) United States Patent   (10) Patent No.: US 8,682,356 B2
Poe et al.                  (45) Date of Patent:    Mar. 25, 2014

(54) METHOD AND SYSTEM OF ELECTRONIC MONITORING

(71) Applicant: Earthsweep, LLC, Cincinnati, OH (US)

(72) Inventors: Brian C. Poe, Lexington, KY (US); Michael P. Miller, Lexington, KY (US); Bryon Sturgill, Lexington, KY (US)

(73) Assignee: Earthsweep LLC, Cincinnati, OH (US)

( * ) Notice: Subject to any disclaimer, the term of this patent is extended or adjusted under 35 U.S.C. 154(b) by 0 days.

(21) Appl. No.: 13/766,345

(22) Filed: Feb. 13, 2013

(65) Prior Publication Data

US 2013/0210465 A1    Aug. 15, 2013

Related U.S. Application Data (63) Continuation of application No. PCT/US2012/071513, filed on Dec. 21, 2012.

(60) Provisional application No. 61/579,092, filed on Dec. 22, 2011.

(51) Int. Cl.
H04W 24/00    (2009.01)

(52) U.S. Cl.
USPC ........................... 455/457; 455/456.1

(58) Field of Classification Search
USPC .......... 455/457, 416, 417, 445, 422.1, 404.2, 455/414.1, 440, 456.1–567; 370/328–338; 701/1, 2, 35, 29
See application file for complete search history.

(56) References Cited

U.S. PATENT DOCUMENTS

| | | | |
|---|---|---|---|
| 5,043,736 A | 8/1991 | Darnell et al. |
| 5,266,944 A | 11/1993 | Carroll et al. |
| 5,298,884 A | 3/1994 | Gilmore et al. |
| 5,369,699 A | 11/1994 | Page et al. |
| 5,396,227 A | 3/1995 | Carroll et al. |
| 5,461,390 A | 10/1995 | Hoshen |
| 5,537,102 A | 7/1996 | Pinnow |
| 5,661,458 A | 8/1997 | Page et al. |
| 5,731,757 A | 3/1998 | Layson, Jr. |
| 5,867,103 A | 2/1999 | Taylor, Jr. |
| 5,892,447 A | 4/1999 | Wilkenson |
| 5,959,533 A | 9/1999 | Layson, Jr. |
| 5,982,281 A | 11/1999 | Layson, Jr. |
| 6,014,080 A | 1/2000 | Layson, Jr. |
| 6,044,257 A | 3/2000 | Boling et al. |
| 6,072,396 A | 6/2000 | Gaukel |

(Continued)

FOREIGN PATENT DOCUMENTS

WO    WO 2008/143379    11/2008

OTHER PUBLICATIONS

International Search Report and Written Opinion dated Apr. 5, 2013 for Application No. PCT/US2012/071513.

(Continued)

*Primary Examiner* — Chuong A Ngo
(74) *Attorney, Agent, or Firm* — Fish & Richardson P.C.

(57) ABSTRACT

GPS data can be transmitted from a portable electronic device to a central database using either a cellular network or a satellite RF network. Multiple embodiments are capable of executing tools and techniques that automatically determine the network appropriate for given conditions, maximize GPS data transmission coverage, and minimize cost. Using the described technology, it is possible to detect, differentiate between, and utilize networks according to circumstance.

23 Claims, 6 Drawing Sheets

(56) References Cited

U.S. PATENT DOCUMENTS

| | | |
|---|---|---|
| 6,100,806 A | 8/2000 | Gaukel |
| 6,130,620 A | 10/2000 | Pinnow et al. |
| 6,160,481 A | 12/2000 | Taylor, Jr. |
| D440,954 S | 4/2001 | Boling et al. |
| 6,226,510 B1 | 5/2001 | Boling et al. |
| 6,285,867 B1 | 9/2001 | Boling et al. |
| 6,337,665 B1 | 1/2002 | Gaukel |
| 6,366,538 B1 | 4/2002 | Anderson et al. |
| 6,405,213 B1 | 6/2002 | Layson et al. |
| 6,606,304 B1 | 8/2003 | Grinter et al. |
| 6,636,732 B1 | 10/2003 | Boling et al. |
| 6,639,516 B1 | 10/2003 | Copley |
| 6,646,617 B1 | 11/2003 | Gaukel |
| 6,703,936 B2 | 3/2004 | Hill et al. |
| 6,774,797 B2 | 8/2004 | Freathy et al. |
| 6,774,799 B2 | 8/2004 | Defant et al. |
| 6,844,816 B1 | 1/2005 | Melton et al. |
| 6,853,304 B2 | 2/2005 | Reisman et al. |
| 6,972,684 B2 | 12/2005 | Copley |
| 6,992,581 B2 | 1/2006 | Reisman et al. |
| 6,992,582 B2 | 1/2006 | Hill et al. |
| 6,998,985 B2 | 2/2006 | Reisman et al. |
| 7,015,817 B2 | 3/2006 | Copley et al. |
| 7,064,670 B2 | 6/2006 | Galperin et al. |
| 7,072,668 B2 | 7/2006 | Chou |
| 7,092,695 B1 | 8/2006 | Boling et al. |
| 7,098,795 B2 | 8/2006 | Adamczyk et al. |
| 7,119,695 B2 | 10/2006 | Defant et al. |
| 7,123,141 B2 | 10/2006 | Contestabile |
| 7,205,890 B2 | 4/2007 | Defant et al. |
| 7,251,471 B2 | 7/2007 | Boling et al. |
| RE39,909 E | 11/2007 | Taylor, Jr. |
| 7,317,377 B2 | 1/2008 | Galperin et al. |
| 7,330,122 B2 | 2/2008 | Derrick et al. |
| 7,382,268 B2 | 6/2008 | Hartman |
| D578,918 S | 10/2008 | Aninye |
| 7,446,656 B2 | 11/2008 | Blakeway |
| 7,456,355 B2 | 11/2008 | Blakeway |
| 7,489,249 B2 | 2/2009 | Better et al. |
| 7,518,500 B2 | 4/2009 | Aninye et al. |
| 7,545,318 B2 | 6/2009 | Derrick et al. |
| 7,619,513 B2 | 11/2009 | Hill et al. |
| 7,630,724 B2 | 12/2009 | Beyer, Jr. et al. |
| 7,636,047 B1 | 12/2009 | Sempek |
| 7,701,171 B2 | 4/2010 | Defant et al. |
| 7,737,841 B2 | 6/2010 | Derrick et al. |
| 7,804,412 B2 | 9/2010 | Derrick et al. |
| 7,864,047 B2 | 1/2011 | Aninye et al. |
| 7,930,927 B2 | 4/2011 | Cooper et al. |
| 7,936,262 B2 | 5/2011 | Derrick et al. |
| 7,961,092 B2 | 6/2011 | Freathy et al. |
| 7,984,540 B2 | 7/2011 | Blakeway |
| 8,009,036 B2 | 8/2011 | Freathy et al. |
| 8,013,736 B2 | 9/2011 | Derrick et al. |
| 8,031,077 B2 | 10/2011 | Derrick et al. |
| 8,232,876 B2 | 7/2012 | Derrick et al. |
| 8,395,513 B2 | 3/2013 | Moran et al. |
| 2006/0199612 A1* | 9/2006 | Beyer et al. ............... 455/556.2 |
| 2007/0038338 A1* | 2/2007 | Larschan et al. ................ 701/2 |
| 2007/139207 A1 | 6/2007 | Agapi et al. |
| 2008/0012760 A1 | 1/2008 | Derrick et al. |
| 2008/0088438 A1 | 4/2008 | Aninye et al. |
| 2008/0096521 A1 | 4/2008 | Boling et al. |
| 2008/0108370 A1 | 5/2008 | Aninye |
| 2008/0316022 A1 | 12/2008 | Buck et al. |
| 2010/0066545 A1 | 3/2010 | Ghazarian |
| 2010/0090825 A1 | 4/2010 | Freathy |
| 2010/0090827 A1 | 4/2010 | Gehrke et al. |
| 2010/0123589 A1 | 5/2010 | Buck et al. |
| 2010/0240969 A1 | 9/2010 | Rompa et al. |
| 2011/0133928 A1 | 6/2011 | Buck et al. |
| 2011/0133937 A1 | 6/2011 | Buck et al. |
| 2011/0195722 A1 | 8/2011 | Walter et al. |
| 2011/0234397 A1 | 9/2011 | Fetzer et al. |
| 2011/0248853 A1 | 10/2011 | Roper et al. |
| 2012/0056744 A1 | 3/2012 | Gemer |
| 2012/0127980 A1* | 5/2012 | Quinn ........................ 370/338 |
| 2013/0006066 A1 | 1/2013 | Melton |

OTHER PUBLICATIONS

Screenshot, 3M Electronic Monitoring, Domestic Violence Proximity Notification System, 2011. Accessed May 22, 2013 http://solutions.3m.com/3MContentRetrievalAPI/BlobServlet?lmd=1316545433000&locale=en_WW&assetType=MMM_Image&assetId=1273695271401&blobAttribute=ImageFile.

Screenshot, Oakland County Michigan, Community Corrections, Electronic Monitoring Devices, 2012. Accessed May 22, 2013 http://www.oakgov.com/commcorr/Pages/program_service/electronic_monitor.aspx.

Utterback's Utterings, Satellite Tracking of People LLC, Stalker Alert, Feb. 1, 2011. Accessed May 22, 2013 http://www.utterbacksutterings.com/category/domestic-violence/.

\* cited by examiner

METHOD AND SYSTEM OF ELECTRONIC MONITORING

CROSS REFERENCE TO RELATED APPLICATIONS

This document is a continuation from patent cooperation treaty application PCT/US12/71513, filed on Dec. 21, 2012, which application claimed the benefit of U.S. provisional patent application Ser. No. 61/579,092, filed on Dec. 22, 2011. Both of those applications have the same title and inventors as the present document, and the disclosures of both of those applications are hereby incorporated by reference in their entirety.

BACKGROUND

1. Field

This invention relates generally to the field of electronic monitoring, and more specifically to the transmission of Global Positioning System (GPS) data, or other location data, over a closed network using a portable electronic device.

2. Related Art

Current systems that track the geographical location of portable electronic devices make extensive use of cellular networks. These networks often include Global Systems of Mobile communication (GSM)/General Packet Radio Service (GPRS) networks and Code Division Multiple Access (CDMA) networks.

However, there are many limitations to the extent of tracking that these networks can execute. For example, cellular networks can only operate within range of cell towers, and can encounter "dead zones" in which a signal fails to transmit. In such cases, the monitoring party may not receive important tracking data unless, and until, the individual being tracked reenters an area with an available cellular network. This lack of tracking data is extremely problematic with regard to monitoring the location of individuals within the criminal justice system and can pose substantial risks to public safety. For example, data often cannot be transmitted about the location of individuals assigned a body-worn transmitter as a result of not being in an area with an available cellular network or not being near an external transmitting device.

SUMMARY

The technology disclosed herein can be used to implement machines, methods and articles of manufacture which can address one or more of deficiencies in the technology currently used in the art. For example, aspects of the technology disclosed herein can be used to implement a system comprising a housing holding a set of components, wherein the set of components may comprise a location data collector, a plurality of radio transceivers, a storage device, a processor a power supply and a set of memory locations. In such a system, the plurality of radio transceivers may comprise a cellular transceiver and a satellite transceiver. The power supply may be configured to supply power to the location data collector, the plurality of radio transceivers and the processor. The set of memory locations could store data operable to configure the processor to perform a set of tasks. Such a set of tasks could comprise automatically switching between communicating with a remote device via the cellular transceiver and the satellite transceiver based on availability of a cellular network via the cellular transceiver and availability of a satellite network via the satellite transceiver. The set of tasks could also comprise sending location data collected by the location data collector to the remote device.

Other embodiments of the disclosed technology are also possible, will be immediately apparent to those of ordinary skill in the art, and could be made and used by those of ordinary skill in the art without undue experimentation in light of the disclosure set forth herein. Accordingly, the discussion of systems which could be implemented using aspects of the disclosed technology should be understood as being illustrative only, and should not be treated as limiting on the protection accorded by this document or any related document.

DETAILED DESCRIPTION

The inventor's technology can be used to enable Global Positioning System (GPS) data to be sent to a remote central database regardless of cellular network availability. As a result, the inventor's technology can be used to allow for more complete and continuous location tracking coverage than would otherwise be available. This location tracking can be performed using an adaptable, physical electronic apparatus equipped with a GPS receiver, a cellular network transceiver, a satellite RF transceiver and a Bluetooth™ (hereinafter "Bluetooth") transceiver. Embodiments of the present invention may also contain a mechanism that allows for additional technologies, i.e. GPS data transmitting technologies beyond the aforementioned networks, to be incorporated as the field advances.

As described herein, various embodiments of the invention use a cellular network and a satellite RF network, alternately, to transmit GPS data back to a central database. Those skilled in the art will recognize that when transmitting via a cellular network there may be physical restrictions as to the extent of coverage. In such an occurrence (e.g. a cellular network is unavailable), systems implemented using the disclosed technology may detect the lack of an available cellular network and automatically switch over to use a satellite RF network to transmit GPS data in lieu of a cellular network. Satellite RF networks can be used to provide availability beyond what is provided by cellular networks because satellite RF networks are not limited to physical towers, and instead operate from space, providing availability in cases where cellular networks may not be accessible. Embodiments of the invention can utilize networks according to circumstance, and execute tools and techniques to determine which network is appropriate to maximize GPS data transmission (coverage) and minimize cost.

The embodiments described within this specification are to be understood as illustrative and exemplary of potential steps, structures, features, and aspects which could be included in embodiments of the disclosed technology and should not be treated as limiting the scope of the invention.

Figure 1:
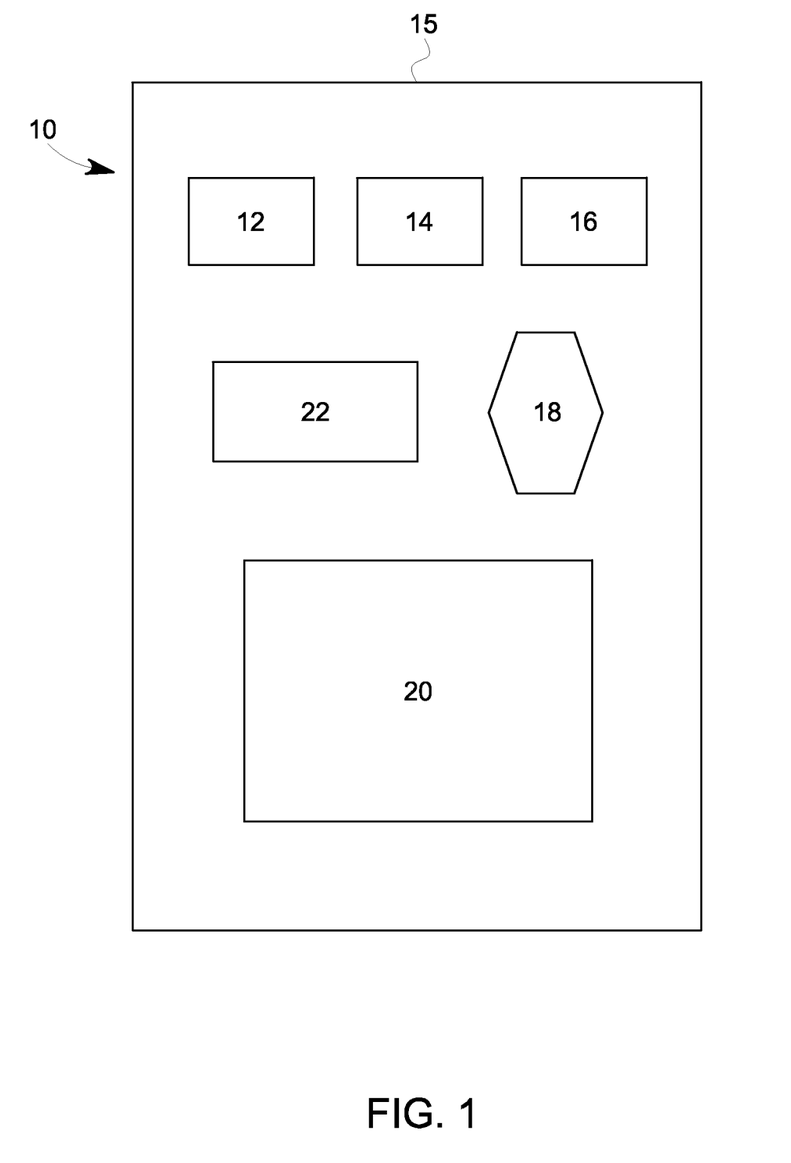
FIG. 1 depicts an exemplary high-level schematic of a specific configuration of a Printed Circuit Board (PCB) configured with certain radios, a storage device and a battery.

FIG. 1 shows and embodiment of a device [10] which could be used in implementing aspects of the disclosed technology. As shown in FIG. 1, such a device could comprise a number of components contained within a housing [15], including a GSM/GPRS chip [12]; a CDMA chip [14]; a Bluetooth transceiver [16]; a 16 Gigabyte (GB) Subscriber Identity Module (SIM) card [18]; a battery [20]; and a satellite transceiver [22]. As described below, aspects of the disclosed technology can be implemented using one or more devices [10] as shown in FIG. 1 to provide various location monitoring and similar functionality.

Figure 2:
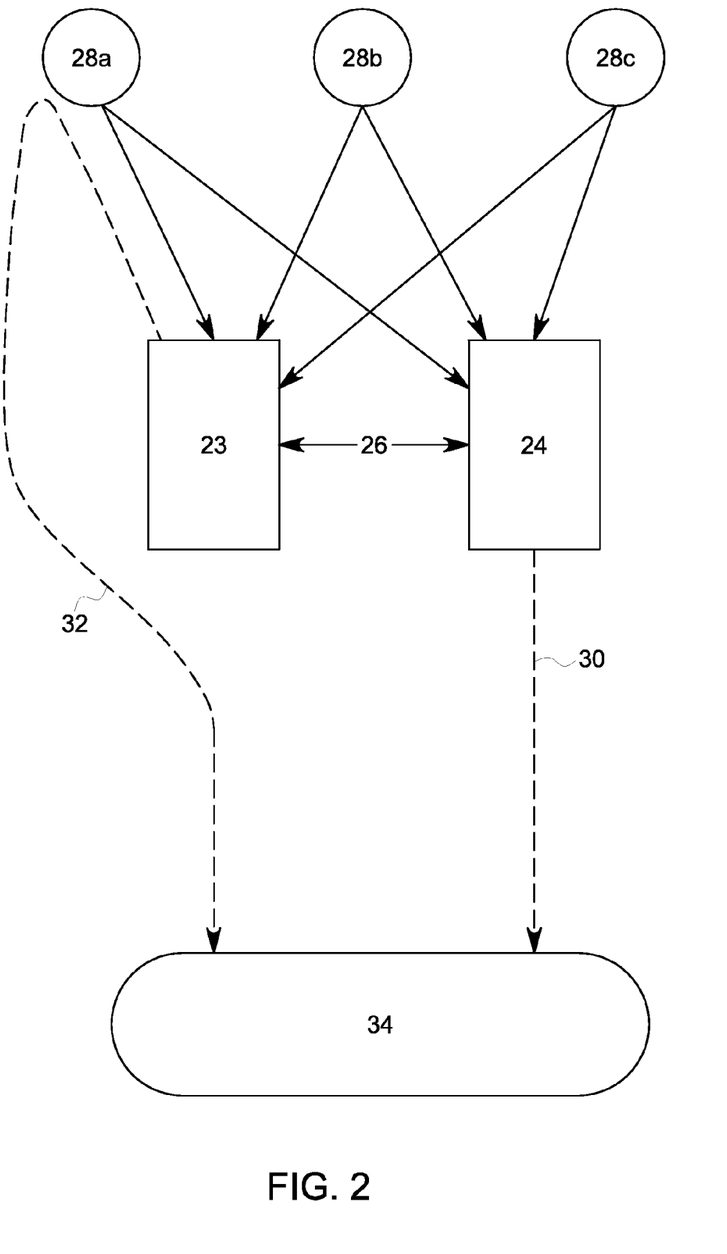
FIG. 2 depicts an exemplary high-level schematic of how multiple devices, configured with a PCB as depicted in FIG. 1, communicate over a cellular and satellite network to send data back to the central database, as well as the individual devices communicating with each other over their Bluetooth radio.

FIG. 2 depicts an exemplary high-level schematic of how multiple devices such as devices of the type depicted in FIG. 1 can work in concert to provide location monitoring and similar functionality. In implementations following FIG. 2, either or both of the devices [23][24], may be Smartphones, body-worn transmitting devices (e.g., ankle bracelets), or any of a variety of devices with capabilities such as described herein. As shown in FIG. 2, using the disclosed technology, multiple devices can be configured to communicate directly with each other (e.g., over Bluetooth transceivers). This direct communication capability can be particularly useful in implementations where it is important to have information on the relative positions of the devices even if the devices are entirely off the grid (i.e., have no ability to connect to either a cellular or satellite network, such as might be the case when the devices are carried by people in a basement or a cave). For example, if the first device [23] (e.g., a smartphone) was in possession of a victim of domestic violence, and the second device [24] (e.g., an ankle bracelet) was in possession of the individual who has perpetrated the act of domestic violence against the victim, the direct communication can be used to inform the victim when the individual who perpetrated the act of domestic violence comes sufficiently close to the victim to allow a direct connection between the devices to be established.

Figure 5:
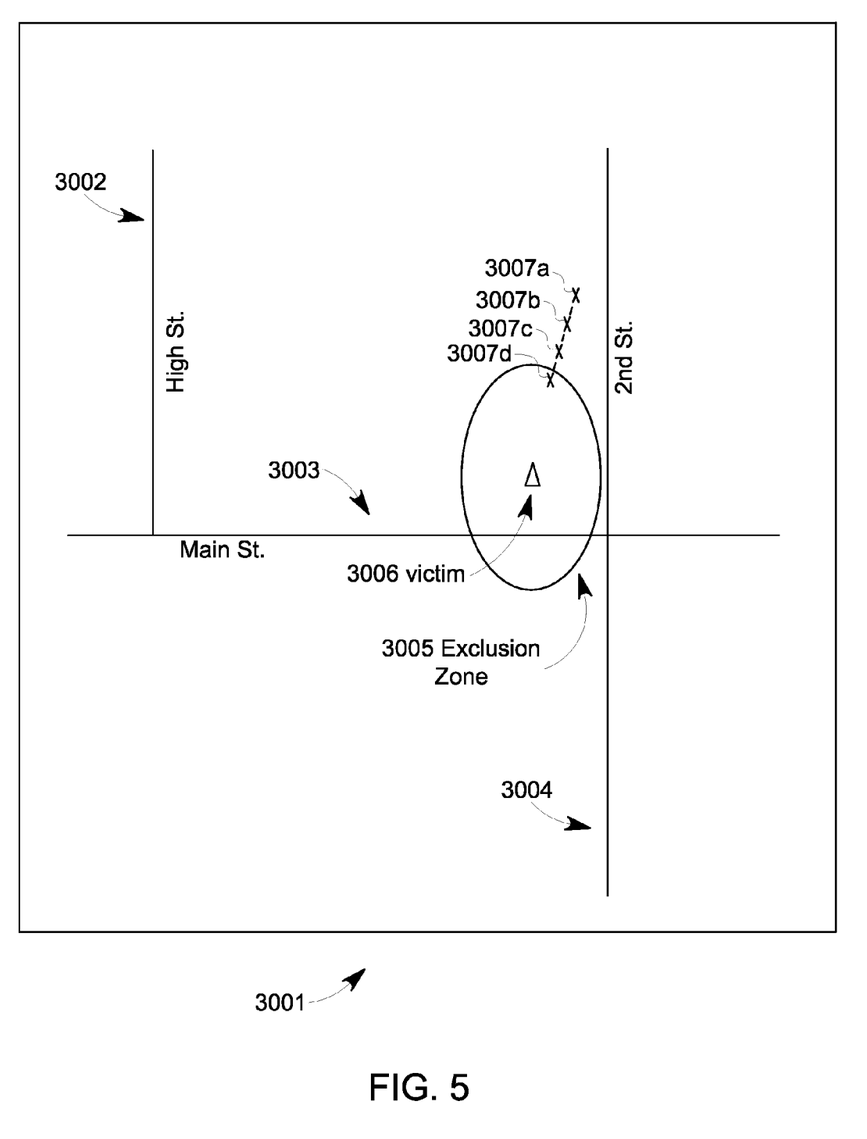
FIG. 5 depicts an exemplary high-level schematic of how two devices, with one device being carried by an individual of victim of domestic violence ("victim") and the other carried by an individual who is the perpetrator of the violence ("offender"), can be used to help ensure the safety of the victim from further actions of the offender.

In addition to, or as an alternative to, providing notification when two devices come close enough to establish a connection, it is also possible that implementations following FIG. 2 could provide additional information that could be useful for maintaining (e.g., in the case of the domestic violence hypothetical described above) or eliminating (e.g., as might be the case if the devices were held by students at a school field trip) separation between devices, or for other location related purposes. An example of the type of information that could be provided on the devices is map information such as illustrated in FIG. 5 (discussed infra), that could provide a holder of a device (e.g., a victim of domestic violence), with detailed information on the relative locations of the devices, and the physical layout of the surrounding area. However, even when such detailed information is not available, such as in an implementation where map information is downloaded from a remote location not available to devices which are off the grid, a direct connection can be used to provide location information, such as by determining an approximate distance, and/or whether the devices are coming closer, based on the strength of the connection between the devices, and on the normal transmitting characteristics of the components (e.g., Bluetooth transceivers in the devices) through which that connection was established.

It is also possible that devices such as shown in FIG. 2 could work in concert in a manner which allows capabilities of one device to accommodate limitations of another. For example, in FIG. 2, a first device [23] is paired with a second device [24], using Bluetooth transceivers [16] in the devices to establish a Personal Area Network (PAN) [26]. Preferably, a system implemented according to the diagram of FIG. 2 will operate with the first and second devices [23][24] collecting GPS data from satellites [28a][28b][28c], which are representative of multiple and redundant satellites orbiting the earth. As preparation for transmitting this information the second device [24] can be configured to determine whether a cellular network is available, and utilizing the PAN [26], can relay this information to the first device [23]. If a cellular network [30] is available, the GPS data can be transmitted back to a central database [34] by the second device [24] via the available cellular network [30]. If the GPS data cannot be sent via the cellular network [30], the first device [23] can use the satellite transceiver [22] (shown in FIG. 1) to find an available satellite RF network [32], to send GPS data back to the central database [34]. This can be useful in cases where the devices have non-overlapping communication components (e.g., one device has a satellite transceiver but not a cellular chip, while the other device has a cellular chip but not a satellite transceiver). It can also be useful in cases where both devices have the same communication components, but one device has limited communication capability (e.g., because the person carrying is in a basement).

Figure 3:
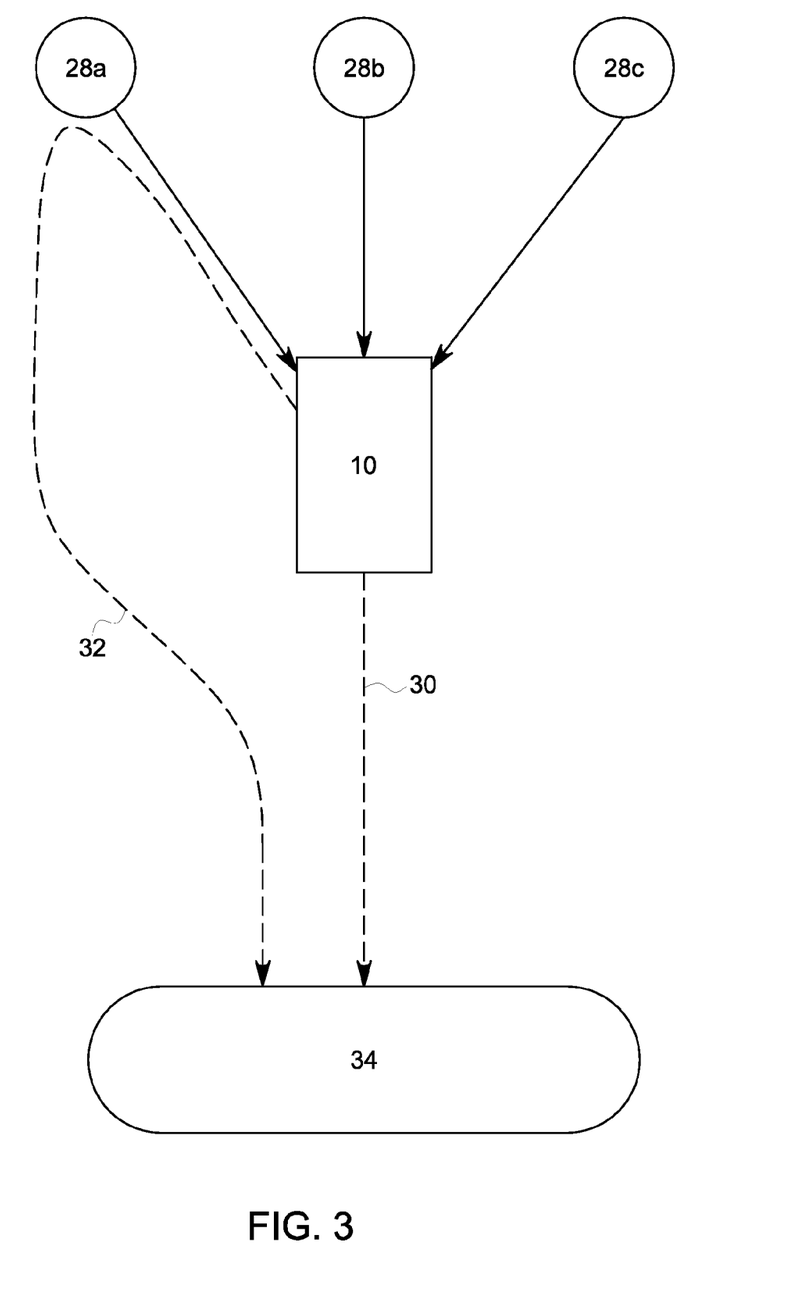
FIG. 3 depicts an exemplary high-level schematic of how a single device, configured with a PCB such as depicted in FIG. 1, can communicate over cellular and satellite networks to send data back to a central database.

Alternative implementations which operate with only a single device [10] are also possible. For example, in an implementation following FIG. 3, a device [10] such as shown in FIG. 1 can act as a standalone device. In such an embodiment, a GPRS/GSM chip [12] and/or CDMA chip [14] (shown in FIG. 1) can be enabled on the device [10] to provide access to the cellular network [30], if available. If a cellular network is not available, then the device [10] could be configured to automatically connect to the satellite RF network [32], via the transceiver [22] (shown in FIG. 1). The device [10] could then use the satellite RF network [32] to send GPS data (or other location data) to the central database [34].

Figure 4A:
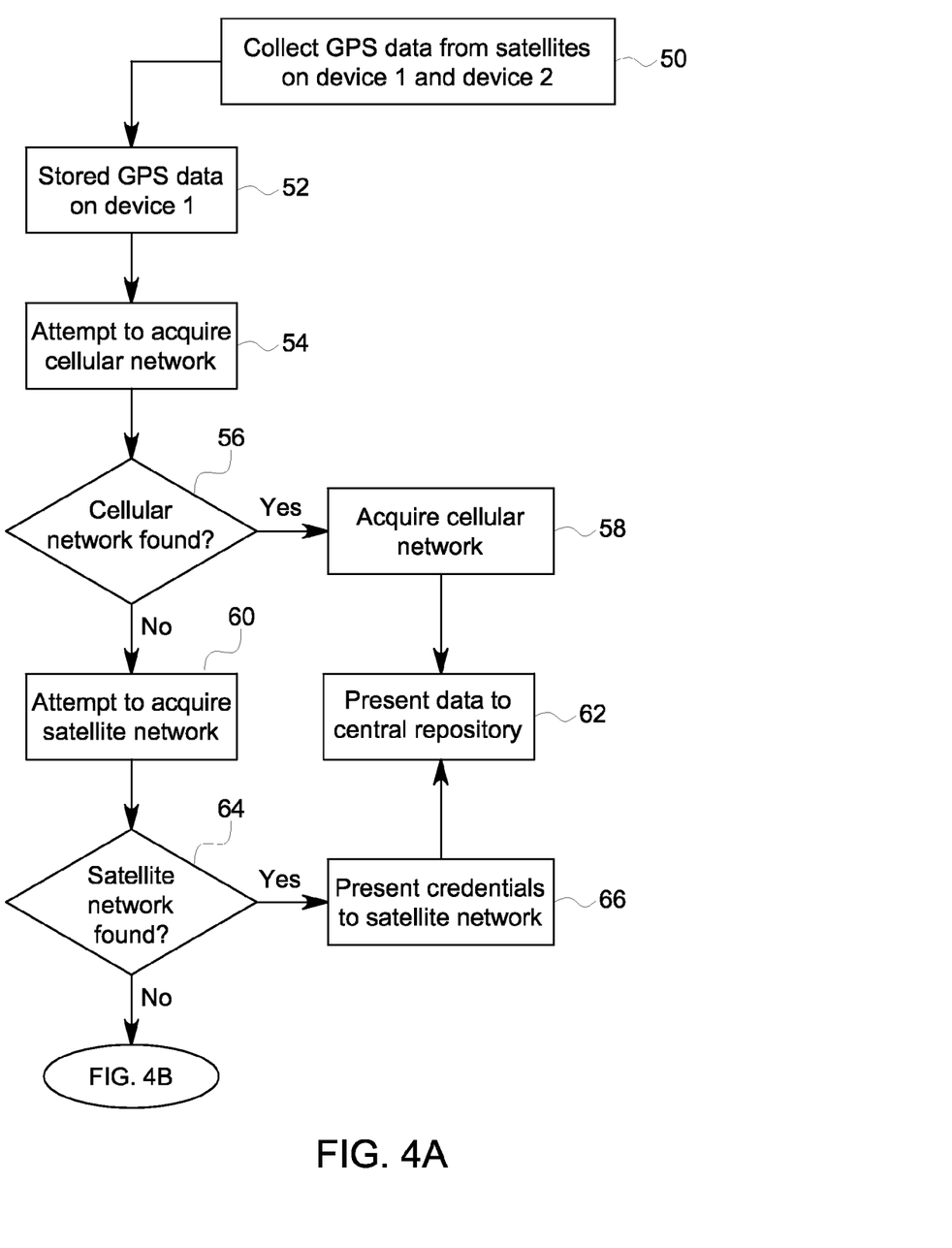
FIGS. 4a-4b depict an exemplary high-level algorithm which can be performed in some systems implementing aspects of the inventor's technology.
Figure 4B:
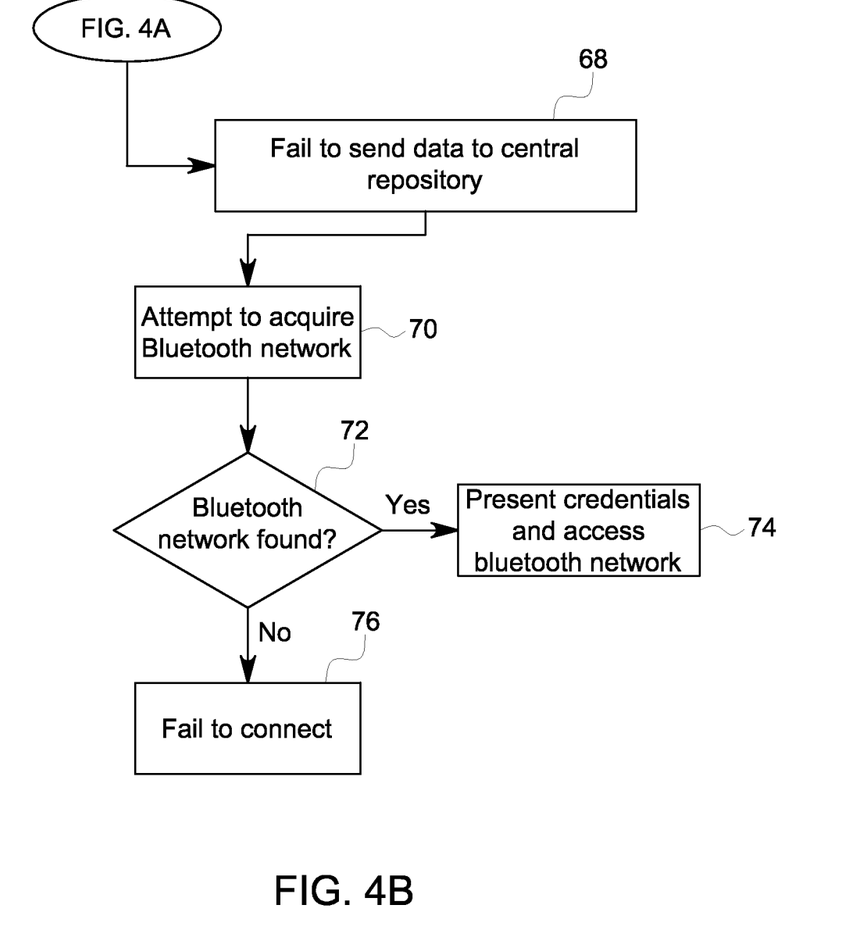

Turning to FIGS. 4a-4b, those figures show a general algorithm for determining network availability and usage, which can be used in systems implementing the inventors' technology. In that algorithm, initially GPS data is collected from satellites orbiting the earth [50]. It is then stored locally on the device which collected it [52], and the device will attempt to establish communication with a cellular network [54]. It will do this by determining if a cellular network can be found [56] and, if it can, it will acquire a connection with the network [58] (e.g., by sending a connection request including an ID for the device's cellular transceiver/chip). Once the connection is acquired, the device will send the collected GPS data to a central repository [62]. If a cellular connection cannot be found, then the device will attempt to acquire a connection to a satellite network [60], which will include determining if the satellite network can be found [64]. If the satellite network can be found, the device will present its credentials [66] to the network (e.g., presenting a device ID for the device's satellite transceiver) and present the data to the central repository [62] in the same manner as if it had established a cellular connection. If no network can be found, then the device will fail to send the GPS data to the central repository [68]. However, it can still attempt to acquire a connection to a Bluetooth network [70]. Thus, in the algorithm of FIGS. 4a-4b, the device determines if a Bluetooth network is found [72]. If it is, then the device presents its credentials (e.g., a transceiver ID which was previously programmed into the device and the device the connection is being established with) and establishes a direct Bluetooth network connection [74]. Otherwise, the algorithm of FIGS. 4a-4b terminates with a failure to connect. Variations on the algorithm of FIGS. 4a-4b are also possible. For example, as described herein, some devices implemented according to this disclosure may include a satellite transceiver but no cellular transceiver. In such case, those devices would not seek to find cellular network before seeking to find a satellite network. Other variations are also possible. Accordingly, the above discussion, as well as the associated algorithm of FIGS. 4a-4b, should be understood as being illustrative only, and not limiting.

Turning to FIG. 5, that figure shows a generic map [3001] depicting three streets [3002][3003][3004]. Further, it shows a circle that depicts an exclusion zone [3005] that is defined as an area surrounding a victim of domestic violence [3006] (who is carrying a first device such as depicted in FIG. 2), which is an area that an offender (who is carrying a second device as depicted in FIG. 2) is not allowed to enter. Generally, this exclusion zone will be an area which, if the offender does enter, he/she will be in violation of a court order to stay a minimum distance away from the victim [3006]. In the map of FIG. 5, the movement of the offender is depicted as a series of points [3007a][3007b][3007c][3007d] showing the location of the offender as he/she approaches the victim [3006], including a final point [3007d] where the offender finally enters the exclusion zone [3005]. At such time, the first device [23] carried by the victim [3006], and the second device [24] carried by the offender will come into contact and create a connection, such as the Bluetooth connection [26] depicted in FIG. 2. This connection can be used to perform a variety of functions which can protect the victim [3006], including (but not limited to), the following:

a. Sending an alert to the device the offender is carrying informing him/her that he/she is violating the exclusion zone [3005];
b. Sending an alert to the device the victim is carrying, which may constitute a vibration of the device, or an audible alert (though it should be understood that, in some embodiments, audible alerts may be disabled since such an alert could give the approaching offender information as to the location of the victim);
c. Presenting a map on the device the victim is carrying, such as a map of the type shown in FIG. 5, showing the present location of the victim [3006], the exclusion zone [3005] and points or other data showing the movement of the offender [3007a-d].

The invention having been described in the foregoing, it will be apparent to those skilled in the art that many variations and/or changes can be made therein without departing from the nature and spirit of the invention, and all such changes and/or variations are intended to be included within the scope of the invention. For example, while the above discussion of FIG. 5 described how a notification (and/or other data) could be sent when an offender enters an exclusion zone he or she is prohibited from entering, it is possible that this type of information could be sent before the offender actually enters an area he or she is prohibited from entering. For instance, a victim could be allowed to define a configurable notification zone, where the victim would be sent a notification whenever the offender has entered the notification zone, even if the notification zone is not co-extensive with the exclusion zone. Similarly, while FIG. 1 depicted a device which included both a GSM/GPRS chip [12] and a CDMA chip [14], in many cases, devices implemented using the disclosed technology could have only a single cellular transceiver (i.e., a GSM/GPRS chip [12] or a CDMA chip [14], but not both), or might be equipped with neither a GSM/GPRS chip [12] or a CDMA chip [14] (e.g., they could rely entirely on satellite networks, BlueTooth, or some other channel for communication). Other variations are also possible, and could be implemented by those of ordinary skill in the art without undue experimentation in light of this disclosure. Accordingly, instead of limiting the protection accorded by this document (or any related document) to the material explicitly disclosed herein, the protection should be understood to be defined by the claims when the terms in the claims which are listed under the heading "Explicit Definitions" are given the explicit definitions set forth herein, and all other terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation provided by a general purpose dictionary, the "Explicit Definitions" and the broadest reasonable interpretation provide by a general purpose dictionary shall control.

Explicit Definitions

When used in the claims, the phrase "GPS data" should be understood to refer to an identifiable unit of information received from a Global Position System satellite orbiting the earth.

When used in the claims, a statement that something is "based on" something else should be understood to mean that something is determined at least in part by the thing that it is indicated as being "based on." When something is completely determined by a thing, it will be described as being "based EXCLUSIVELY on" the thing.

When used in the claims, or within any part of this document, the phrase "central database" should be understood to refer to a physical or virtual location to store data either in a physical or virtual data storage device that can be accessed via devices on a network to either add to, or retrieve from, data for a specific purpose.

When used in the claims, or within any part of this document, the term "processor" should be understood to refer to a device or group of devices capable of performing one or more logical and/or physical operations on data to produce a result. A processor may include, for example, a single-core or multi-core microcontroller or microcomputer, configured as an embedded processor or as a part of a portable electronic device.

Accordingly, we claim:
1. A tracking device configured to be worn by a user for location tracking of the user, the device comprising:
a housing, the housing configured to be worn by a user, the housing holding:
a global positioning system device (GPS) configured to collect geographic location data that delineates a physical location of the tracking device;
a cellular transceiver;
a satellite transceiver;
a peer to peer transceiver configured to communicate location data with a specified, paired peer to peer transceiver;
a storage device configured to store location data collected by the global positioning system device;

a processor configured to
  determine which of the cellular transceiver or the satellite transceiver to automatically communicate with a remote unit based on availability of a cellular network for the cellular transceiver, by configuring the processor to;
    search for an available cellular network and when a cellular network is found causing the cellular transceiver to establish a connection and when an available cellular network is not found, the processor is configured to:
    search for an available satellite network and when a satellite network is found causing the satellite transceiver to establish a connection;
    cause the tracking device to send the location data collected by the global positioning system device to the remote unit, over the connection established via the determined one of the cellular or satellite transceivers; and
    cause the peer to peer transceiver configured to communicate location data with a specified, paired peer transceiver by presenting peer to peer credentials previously programmed into the tracking device, and presenting a transceiver ID of the specified peer to peer transceiver to establish a direct peer to peer network connection with the specified paired peer to peer transceiver.

2. The device of claim 1 wherein the geographic location data sent to the remote unit comprises a set of geographic locations and time data corresponding to times at the geographic locations.

3. The device of claim 1 wherein the peer to peer transceiver in the tracking device is a Bluetooth transceiver.

4. The device of claim 1 wherein the housing is a smartphone housing.

5. The device of claim 1 wherein the housing is an ankle monitor housing.

6. The device of claim 1 wherein the processor in the tracking device is further configured to:
  receive data that specifies a geographic location of the specified, pair peer transceiver that is disposed in a client device;
  retrieve data corresponding to an exclusion zone that is an established distance to maintain by the tracking device apart from the client device; and
  determine whether the tracking device is within the exclusion zone.

7. The device of claim 1 wherein when the processor in the tracking device is unable to find either a cellular or a satellite network, the processor is further configured to:
  attempt to establish the connection by the peer to peer transceiver with the specified, paired peer transceiver; and when established,
  send the location data to the specified, paired peer transceiver, the location data including the geographic location of the tracking device.

8. The device of claim 1 wherein the processor is further configured to:
  display a map showing detailed information on the relative locations of the first and second devices.

9. A method comprising:
  collecting location data specifying location of a portable electronic device worn by a user for transmission of the location data from the portable electronic device to a central database;
  storing the collected location data in a storage device on the portable electronic device;
  determining by a processor on the portable electronic device a network over which to send the location data by the processor first
  determining whether a cellular network is available, when a cellular network is available,
    sending the location data stored in the storage device to the central database over the available cellular network;
  when a cellular network is not available,
  determining by the processor on the portable electronic device whether a satellite network is available; when a satellite network is available,
    sending the location data stored in the storage device to the central database over the satellite network; and
    searching for an available peer to peer network, when found
    presenting peer to peer credentials of a peer to peer transceiver previously programmed into the tracking device and presenting a transceiver ID of a specified peer to peer transceiver to establish a direct peer to peer network connection with the specified peer to peer transceiver.

10. The method of claim 9 further comprising:
  sending by the peer to peer transceiver the location data to the specified peer to peer transceiver.

11. The method of claim 9 further comprising:
  receiving data that specifies a location of the specified peer to peer device;
  retrieving data corresponding to an exclusion zone that is an established distance to maintain by the tracking device apart from the specified peer to peer device for separation of the tracking device from the peer device; and
  determining whether the tracking device is within the exclusion zone.

12. The method of claim 9 wherein when neither a cellular nor a satellite network is available,
  attempting to establish the connection by the peer to peer transceiver on the portable electronic device with the specified peer to peer transceiver in a second different electronic device; and when established,
  sending the location data to the specified peer to peer transceiver.

13. A system comprising:
  a first portable device configured to be worn by a user for location tracking of the user, the device comprising:
  a first housing, the housing holding:
    a first global positioning system device (GPS) configured to collect geographic location data that delineates a geographic location of the first device;
    a cellular transceiver;
    a satellite transceiver;
    a storage device configured to store location data collected by the global positioning system device;
    a first processor configured to:
      automatically communicate with a remote unit using either the cellular transceiver when an available cellular network is found or the satellite transceiver when a cellular network is not found;
      cause the device to send geographic location data collected by the global positioning system device via either the cellular transceiver or the satellite transceiver to the remote unit; and
    a first Bluetooth transceiver configured to communicate the geographic location data to a specified, second Bluetooth transceiver;

a second device that includes the specified, second Bluetooth transceiver device, the second device further including:
a second global positioning system device (GPS) configured to collect location data of the second device;
a second processor that receives geographic location data of the first device and geographic location data of the second device to calculate relative geographic locations of the first device to the second device, the processor further configured to alert a user of the second device on the relative geographic locations of the first and second devices.

14. The system of claim 13, wherein the remote unit is a central database to receive and store the geographic location data collected by the global positioning system device of the first portable device, sent via the cellular transceiver or the satellite transceiver.

15. The system of claim 13, wherein the remote unit is configured to:
determine whether the first portable device is within an established exclusion zone;
send an alert to the second device when the first portable device is within the established exclusion zone.

16. The system of claim 13, wherein the remote unit is configured to:
cause the second device of the second user to display a map showing detailed information on the relative locations of the first portable device and second device.

17. A method comprises:
collecting location data of a first portable electronic device configured to be worn by a user;
storing the collected location data in a storage device on the first portable electronic device;
determining by a processor on the first portable electronic device whether to use a cellular network or a satellite network to send the location data stored in the storage device to the central database with determining based on whether a cellular network is available;
sending the location data stored in the storage device to the central database over the determined one of the cellular and satellite networks;
presenting peer to peer credentials previously programmed into the first portable electronic device, and presenting a transceiver ID of a specified peer to peer transceiver to establish a direct peer to peer network connection with the specified paired peer to peer transceiver;
sending the location data stored in the storage device from a first peer to peer transceiver in the first portable device to a specified second peer to peer transceiver device in a second, different portable device;
receiving by at least a first one of the first and second portable devices locational data of the other one of the first and second portable devices; and
determining by a processor in the at least first one of the first and second portable devices relative positions of the first and second peer to peer transceiver devices.

18. The method of claim 17, wherein the remote unit is a central database to receive and store the location data collected by the global positioning system device, sent via the cellular transceiver or the satellite transceiver.

19. The method of claim 17, further comprising:
determining whether the first portable electronic device is within an established exclusion zone;
sending an alert to the second portable electronic device.

20. The method of claim 19, further comprising:
causing the second portable, electronic device to display a map showing detailed information on relative locations of the first portable, electronic device and the second portable, electronic device.

21. The method of claim 19, further comprising:
causing the second portable, electronic device to alert a user according to changes in relative locations of the first portable, electronic device and the second portable, electronic device.

22. A device for real-time location monitoring of an individual, the device comprising:
a housing, the housing holding:
a global positioning system device (GPS) configured to collect location data that delineates a location of the tracking device;
a peer to peer transceiver configured to communicate with a specified, peer to peer transceiver by presenting peer to peer credentials previously programmed into the device, and presenting a transceiver ID of the specified peer to peer transceiver to establish a direct peer to peer network connection with the specified paired peer to peer transceiver;
a storage device configured to store location data collected by the global positioning system device;
a processor configured to:
receive location data collected by the global positioning system device;
receive location data collected by a second, different global positioning system device (GPS), the second GPS device from a tracking device configured to be worn by the individual, once a connection is established between the peer to peer transceiver and the specified, peer to peer transceiver in the tracking device;
retrieve data corresponding to an exclusion zone for separation of the monitoring device from the peer device; and
determine whether the peer device has entered the exclusion zone.

23. The device of claim 22 wherein the housing is a smartphone housing, and the peer to peer transceiver in the housing is a Bluetooth transceiver.

* * * * *